US006484206B2

(12) United States Patent
Crump et al.

(10) Patent No.: US 6,484,206 B2
(45) Date of Patent: *Nov. 19, 2002

(54) EFFICIENT RECOVERY OF MULTIPLE CONNECTIONS IN A COMMUNICATION NETWORK

(75) Inventors: Richard Crump, Boston, MA (US); Todd Short, Maynard, MA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,746

(22) Filed: Oct. 7, 1998

(65) Prior Publication Data

US 2002/0078208 A1 Jun. 20, 2002

(51) Int. Cl.[7] ................................................ G06F 15/16
(52) U.S. Cl. .................. 709/227; 709/223; 709/230; 709/237; 709/250; 370/401; 370/466; 370/467; 714/4
(58) Field of Search ................................. 709/200, 203, 709/217–221, 223–224, 227–228, 230–237, 238–239, 242–246, 249–250; 714/2–4, 15, 19–20, 712; 710/11–14; 370/400–401, 466–467

(56) References Cited

U.S. PATENT DOCUMENTS

| 5,021,949 | A | | 6/1991 | Morten et al. ............... 709/231 |
|---|---|---|---|---|
| 5,023,873 | A | * | 6/1991 | Stevenson et al. ............. 714/4 |
| 5,182,748 | A | | 1/1993 | Sakata et al. ................ 370/466 |
| 5,636,212 | A | | 6/1997 | Ikeda .......................... 370/233 |
| 5,652,908 | A | * | 7/1997 | Douglas et al. ............. 709/228 |
| 5,793,771 | A | | 8/1998 | Darland et al. ............. 370/467 |
| 5,802,258 | A | * | 9/1998 | Chen .......................... 709/227 |
| 5,838,989 | A | * | 11/1998 | Hutchison et al. ............ 710/11 |
| 5,856,981 | A | * | 1/1999 | Voelker ....................... 714/712 |
| 5,918,017 | A | * | 6/1999 | Attanasio et al. ........... 709/224 |
| 5,918,022 | A | | 6/1999 | Batz et al. ................... 709/236 |
| 5,933,422 | A | * | 8/1999 | Kusano et al. .............. 709/239 |
| 5,943,481 | A | | 8/1999 | Wakeland .................... 709/230 |
| 6,044,407 | A | | 3/2000 | Jones et al. ................. 709/246 |
| 6,055,224 | A | | 4/2000 | King .......................... 370/217 |
| 6,098,116 | A | * | 8/2000 | Nixon et al. ................ 709/220 |
| 6,131,125 | A | * | 10/2000 | Rostoker et al. ............ 709/227 |
| 6,134,640 | A | | 10/2000 | Unno et al. ................. 711/171 |
| 6,192,409 | B1 | | 2/2001 | Kim .......................... 709/230 |
| 6,226,676 | B1 | | 5/2001 | Crump et al. ............... 709/227 |
| 6,311,222 | B1 | * | 10/2001 | Crump et al. ............... 709/230 |

OTHER PUBLICATIONS

Stevens, W. Richard, "TCP Establishment and Termination," *TCP/IP Illustrated, vol. 1*, Addison–Wesley Longman, Inc., 1994, ISBN 0–201–63346–9 (v.1).

* cited by examiner

*Primary Examiner*—Bharat Barot
(74) *Attorney, Agent, or Firm*—Withrow & Terranova, P.L.L.C.

(57) ABSTRACT

An efficient technique for recovering multiple connections detects a connection failure affecting multiple clients, selects one of the number of affected clients, repeatedly attempts to reestablish the failed connection between the selected client and the server until the connection is successfully re-established, and then re-establishes the connections for the remaining clients.

23 Claims, 8 Drawing Sheets

EFFICIENT RECOVERY OF MULTIPLE CONNECTIONS IN A COMMUNICATION NETWORK

CROSS-REFERENCES TO RELATED APPLICATIONS

This patent application may be related to the following commonly-owned United States patent applications:

U.S. patent application Ser. No. 09/167,916 entitled CONNECTION ESTABLISHMENT AND TERMINATION IN A MIXED PROTOCOL NETWORK, filed on even date now U.S. Pat. No. 6,226,676 and hereby incorporated by reference in its entirety;

U.S. patent application Ser. No. 09/167,950 entitled ERROR RECOVERY IN A MIXED PROTOCOL NETWORK, filed on even date herewith, still pending and hereby incorporated by reference in its entirety;

U.S. patent application Ser. No. 09/167,839 entitled ESTABLISHING AND TERMINATING CONNECTIONS IN A MIXED PROTOCOL NETWORK, filed on even date herewith, now U.S. Pat. No. 6,320,874 and hereby incorporated by reference in its entirety;

U.S. patent application Ser. No. 09/167,792 entitled SYSTEM FOR TRANSLATING A MESSAGE FROM A FIRST TRANSMISSION PROTOCOL TO A SECOND TRANSMISSION PROTOCOL, filed on even date herewith, still pending and hereby incorporated by reference in its entirety; and U.S. patent application Ser. No. 09/167,811 entitled TRANSLATOR MEMORY MANAGEMENT SYSTEM, filed on even date herewith, now U.S. Pat. No. 6,311,222 and hereby incorporated by reference in its entirety.

FIELD OF THE INVENTION

The present invention relates generally to data communication networks, and, more particularly, to recovery of multiple connections in a communication network.

BACKGROUND OF THE INVENTION

In today's information age, data communication networks are becoming ever more pervasive as an ever-increasing number of communication consumers require access to on-line computer resources. To that end, many data communication networks are evolving to meet the needs of these communication consumers. In order to support a large number of users, it is important for the protocols used in the data communication networks to be efficient.

A common network configuration (referred to hereinafter as the "client-server model") includes a number of client devices that communicate with a common server over the communication network. In this client-server model, each client establishes a connection to the server over the communication network. Thus, the server represents a common destination for all of its connected clients.

In the client-server model, it is typical for client-server connections to be established and terminated dynamically. For example, it is common for existing clients to disconnect from the server and for new clients to connect to the server. When connections are established and terminated using a prescribed protocol, there is generally no disruption to other existing connections.

Under certain circumstances, though, it is possible for multiple clients to become disconnected from the server. When this occurs, it is typical for the affected clients to try to reestablish the connections to the server. When multiple clients attempt to connect to the server simultaneously, the communication network can become inundated with protocol messages sent by the clients. Furthermore, it is likely that the simultaneous attempts to re-establish the connections to the server will either all fail, if the server remains inaccessible, or all succeed, if the server becomes accessible. Therefore, an efficient technique for recovering multiple connections is needed.

SUMMARY OF THE INVENTION

In accordance with one aspect of the invention, a method, translating apparatus, apparatus comprising a computer readable medium, and system includes a translating function for recovering multiple connections in a communication network. The translating function detects a failure affecting a plurality of connections, selects one of said plurality of connections, performs a connection establishment procedure to re-establish the selected connection, and, upon successfully re-establishing the selected connection, performs the connection establishment procedure for the remainder of the plurality of connections.

In a preferred embodiment of the invention, the translating function utilizes timer-driven connection recover logic to periodically re-establish failed connections. The timer is started upon detection of an initial connection failure.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, an efficient technique for recovering multiple connections is needed. The present invention provides such an efficient technique for recovering multiple connections by selecting one of the affected clients, repeatedly attempting to re-establish the failed connection between the selected client and the server until the connection is successfully re-established, and then re-establishing the connections for the remaining clients. In this way, only one client attempts to connect to the server while the server is inaccessible, and the remaining clients only attempt to re-establish the connection after the server becomes accessible.

Figure 1:
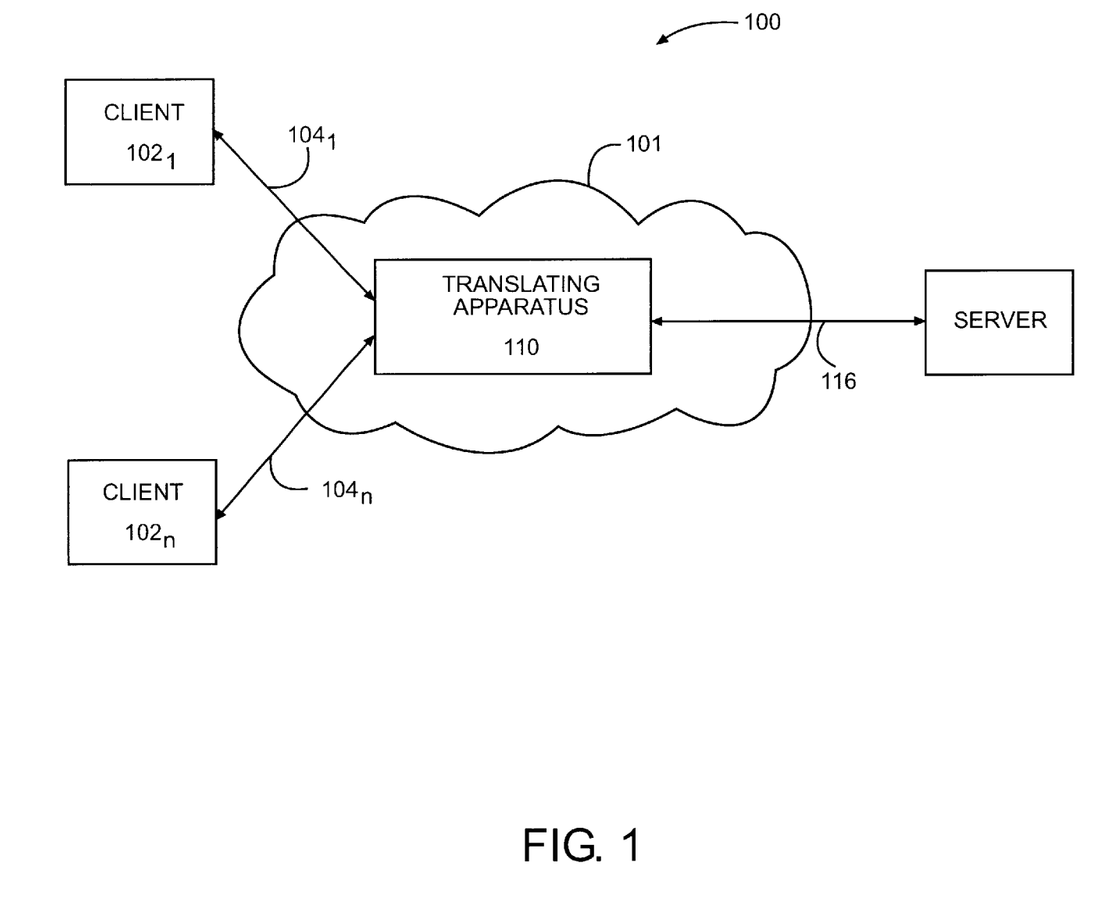
FIG. 1 shows a client-server communication network in accordance with a preferred embodiment of the present invention.

FIG. 1 shows a number of clients $102_1$ through $102_n$ (referred to collectively as "clients 102") in communication with a server 118 over a communication network 101. The clients 102 are coupled to the communication network 101 by way of links $104_1$ through $104_n$. The server 118 is coupled to the communication network by way of link 116.

Continuing to refer to FIG. 1, the communication network 101 includes a translating apparatus 110. The translating apparatus 110 is in communication with the clients 102 and the server 118. The translating apparatus 110 facilitates communication between the clients 102 and the server 118 by establishing connections between the clients 102 and the server 118, terminating connections between the clients 102 and the server 118, recovering from connection failures between the clients 102 and the server 118, and transferring application data between the clients 102 and the server 118.

Figure 2:
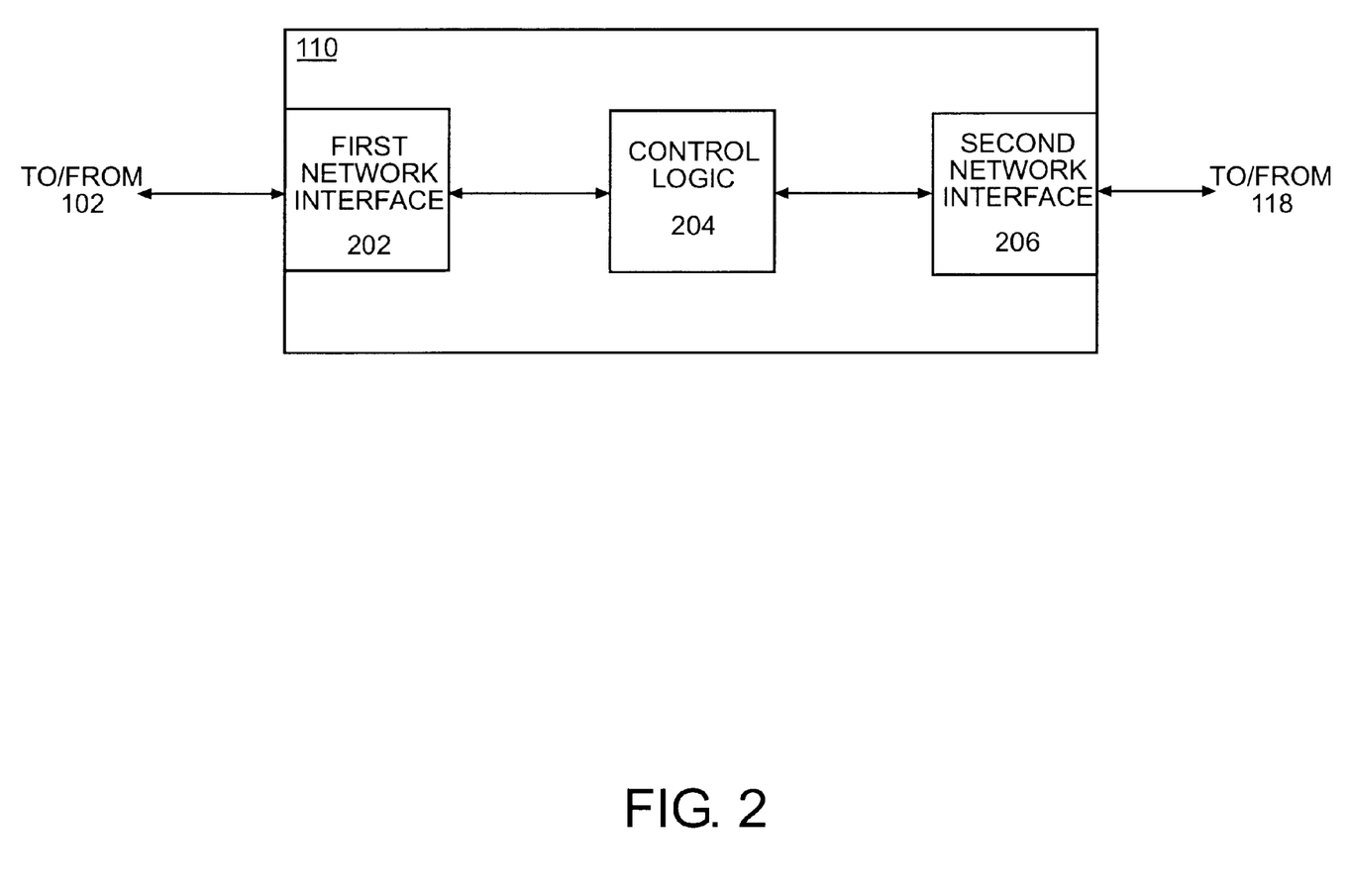
FIG. 2 is a block diagram of an exemplary translating apparatus in accordance with a preferred embodiment of the present invention.

FIG. 2 is a block diagram of an exemplary translating apparatus 110 in accordance with a preferred embodiment of the present invention. The translating apparatus 110 includes a first network interface 202 that is couplable to the clients 102 and a second network interface 206 that is couplable to the server 118.

Continuing to refer to FIG. 2, the translating apparatus 110 further includes control logic 204. The control logic 204 performs a translation function to allow the clients 102 to communicate with the server 118. The control logic 204 is operably coupled to the first network interface 202, through which the control logic 204 communicates with the clients 102. The control logic 204 is also operably coupled to the second network interface 206, through which the control logic 204 communicates with the server 118.

The translating apparatus 110 acts as a proxy in order to enable communication between the clients 102 and the server 118. Specifically, the translating apparatus 110 functions as a server when communicating with the clients 102 and functions as a client when communicating with the server 118. The control logic 204 controls connection establishment, connection termination, recovery from failed connections, and data transfers on behalf of the clients 102 and the server 118.

Because the translating apparatus 110 is situated such that the connections between the clients 102 and the server 118 go through the translating apparatus 11(0, the control logic 204 is able to monitor the status of those connections. Therefore, when a connection fails unexpectedly, the control logic 204 takes steps of re-establish the failed connection.

When communication between the translating apparatus 110 and the server 118 is lost, all client connections to the server 118 are lost. In this situation, the translating apparatus 110, and particularly the control logic 204, attempts to re-establish all of the connections between the clients 102 and the server 118.

In the prior art, each client connection would be handled separately by the control logic 204, and therefore the control logic 204 would attempt to simultaneously re-establish connections for all of the clients 102. In this situation, it is likely that the simultaneous attempts to re-establish the connections to the server would either all fail, if the server remains inaccessible, or all succeed, if the server becomes accessible.

In a preferred technique for re-establishing the client connections, the translating apparatus 110 detects a failure affecting multiple client connections. Then, instead of attempting to re-establish all of the client connections simultaneously, the translating apparatus 110 selects one of the failed client connections and attempts to re-establish only the selected client connection. Once the selected client connection is re-established, the remaining client connections are re-established.

Figure 3:
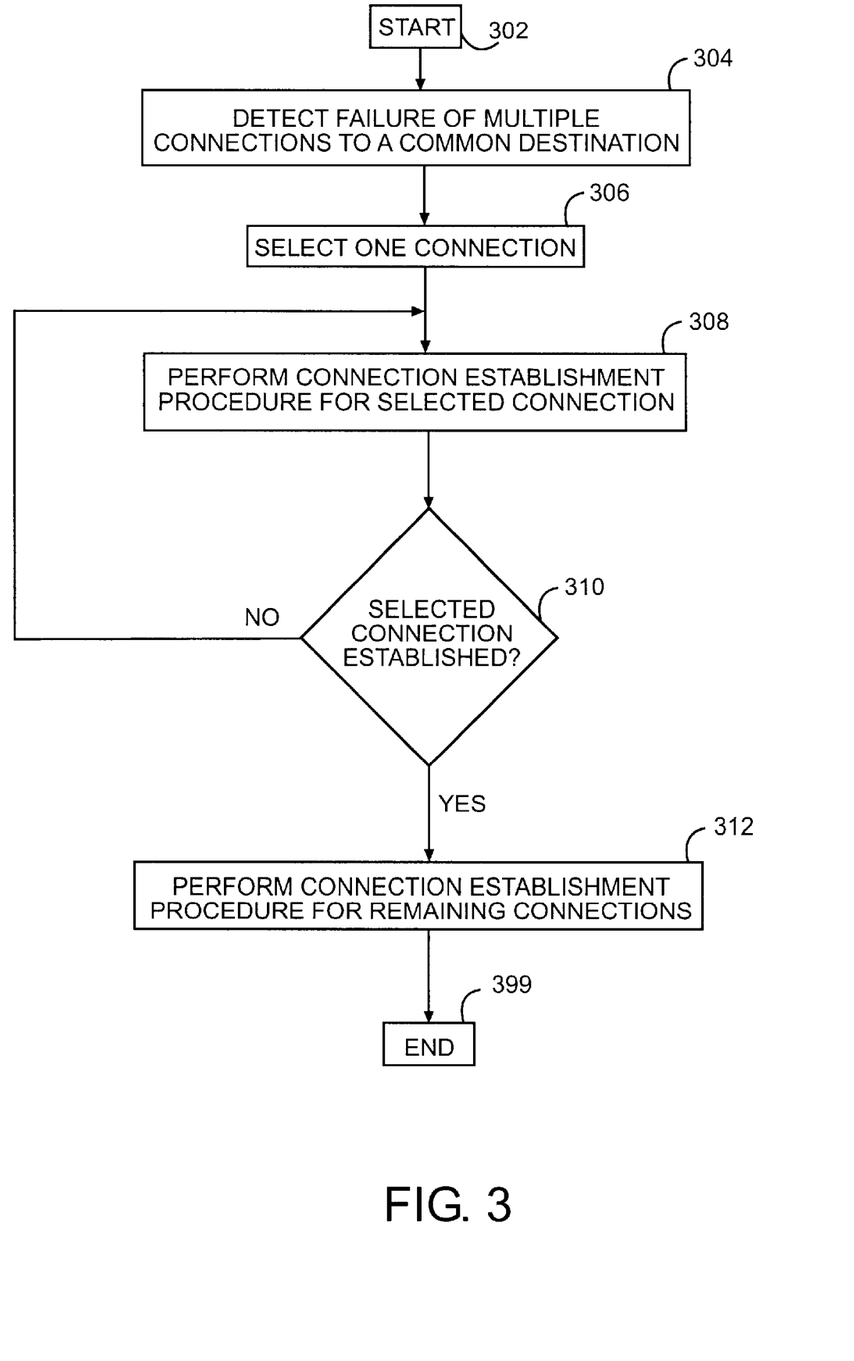
FIG. 3 is a logic flow diagram showing exemplary connection recovery logic for reestablishing the client connections in accordance with an embodiment of the present invention.

Thus, the translating apparatus 110, and particularly the control logic 204, includes connection recovery logic for re-establishing the client connections. More specifically, the control logic 204 includes logic for performing a set of steps as shown in FIG. 3. After beginning in step 302, and upon detecting a failure affecting multiple connections to the server 118 in step 304, the control logic 204 selects one connection from among the plurality of connections, in step 306, and performs a connection establishment procedure for the selected connection, in step 308. The control logic 204 then determines whether or-not the selected connection was successfully re-established, in step 310. If the selected connection failed to be established (NO in step 310), then the control logic 204 repeats the connection establishment procedure of step 308. However, if the selected connection was successfully established (YES in step 310), then the control logic 204 proceeds to perform the connection establishment procedure for the remaining client connections, in step 312, and terminates in step 399.

Figure 4A:
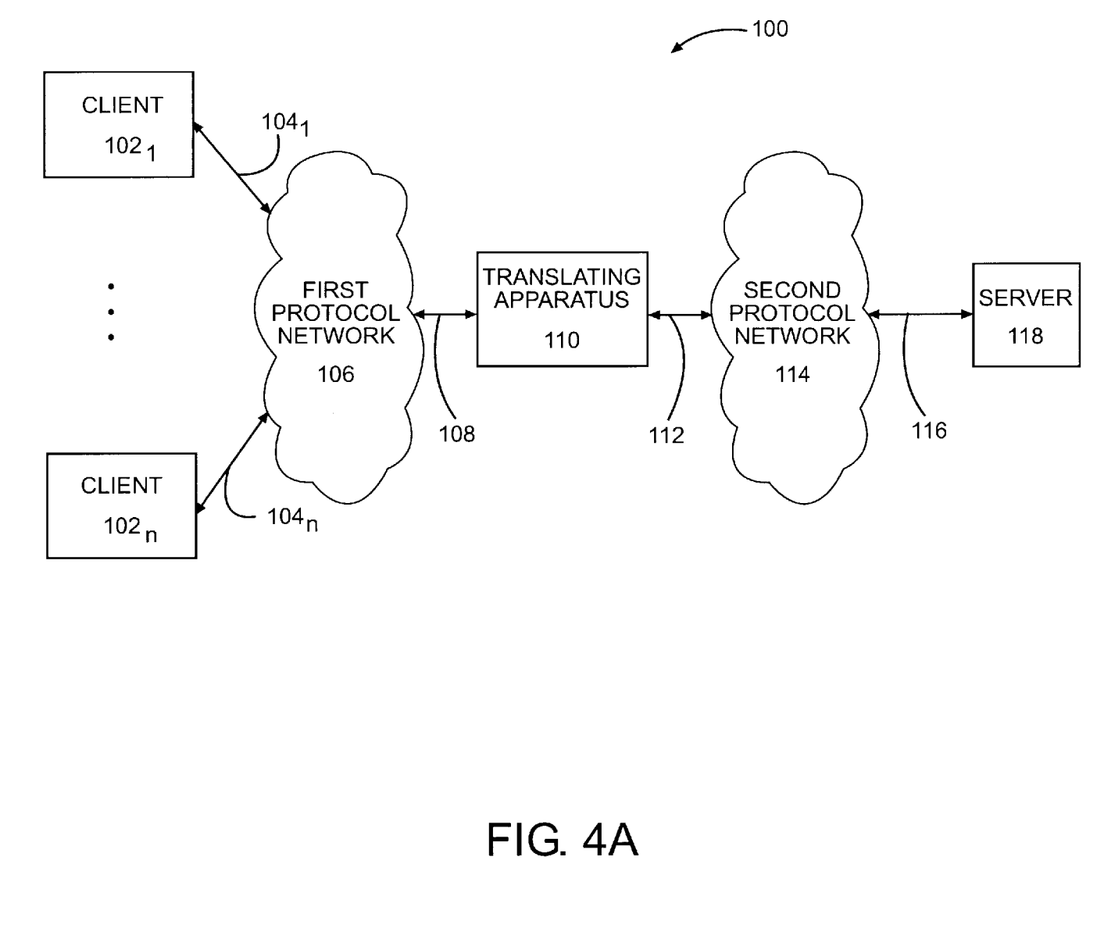
FIG. 4A is a block diagram of an exemplary data communication network in which a translating apparatus is used to allow clients, which communicate with the translating apparatus over a first protocol network, to communicate with a server, which communicates with the translating apparatus over a second protocol network.

FIG. 4A shows an exemplary communication network 100 in accordance with a preferred embodiment of the present invention. In the exemplary communication network 100 as shown in FIG. 4A, the clients 102 communicate with the translating apparatus 110 over a first protocol network 106 using a first communication protocol, and the translating apparatus 110 communicates with the server 118 over a second protocol network 114 using a second communication protocol. More specifically, the clients 102 are coupled to the first protocol network 106 by way of a links $104_1$ through $104_n$. The translating apparatus 110 is also coupled to the first protocol network 106 by way of a link 108. The clients 102 communicate with the translating apparatus 110 over the first protocol network 106 using the first communication protocol, and, in particular, over connections that are established between the clients 102 and the translating apparatus 110.

Continuing to refer to FIG. 4A, the server 118 is coupled to a second protocol network 114 by way of a link 116. The translating apparatus 110 is also coupled to the second protocol network 114 by way of a link 112. The server 118 communicates with the translating apparatus 110 over the second protocol network 114 using the second communication protocol, and in particular, over a connection that is established between the server 118 and the translating apparatus 110.

In accordance with a preferred embodiment of the present invention, the first communication protocol is a protocol known as the X.25 protocol. The X.25 protocol defines the physical, link, and network layer protocols (layers one, two, and three) of the International Standards Organization (ISO) seven-layer protocol model. In a communication network that utilizes the X.25 protocol (referred to herein as an "X.25 network"), two devices (referred to herein as an "X.25 device" or "X.25 devices") exchange X.25 network layer messages (referred to in X.25 as "packets") over a virtual circuit that is established across the X.25 network. One type of virtual circuit commonly used in the X.25 network is a permanent virtual circuit or PVC. A PVC is a virtual circuit that is set up automatically within the X.25 network and remains active as long as the X.25 network is operative (as opposed to a switched virtual circuit or SVC, which is set up only when explicitly requested by an X.25 device). Typical X.25 networks support multiple virtual circuits, both permanent and switched.

In accordance with a preferred embodiment of the present invention, the second communication protocol is a protocol known as the Transmission Control Protocol (referred to hereinafter as "TCP"). TCP is a connection-oriented transport layer protocol that is generally used in conjunction with a connectionless network layer protocol known as the Internet Protocol or IP. In a communication network that utilizes the TCP protocol (referred to herein as a "TCP/IP network"), two devices (referred to herein as a "TCP device" or "TCP devices") exchange TCP messages (referred to in TCP as "segments") over a TCP connection that is established across the TCP/IP network. In order to set up the TCP connection within the TCP/IP network, two TCP devices exchange specially formatted messages that include, among other things, an IP address identifying the destination TCP device and a TCP port number identifying one of a number of applications supported by the destination TCP device. The combination of IP address and TCP port number is referred to hereinafter as a "socket." Because the TCP connection is set up only when explicitly requested by a TCP device, the TCP connection is considered to be a switched connection as opposed to a permanent connection.

Figure 4B:
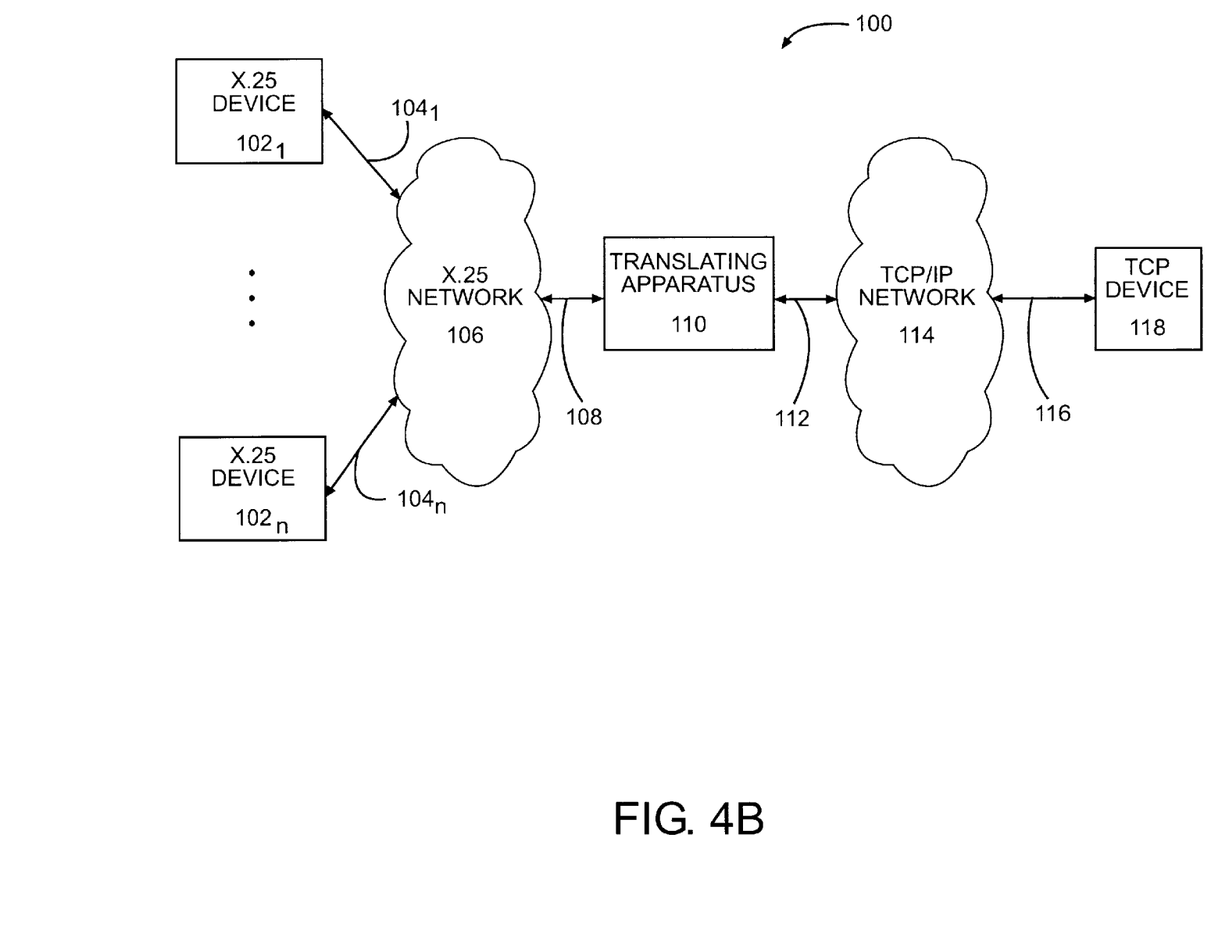
FIG. 4B is a block diagram of a preferred embodiment of the exemplary data communication network in which the translating apparatus is used to allow X.25 devices, which communicate with the translating apparatus over an X.25 network, to communicate with a TCP device, which communicates with the translating apparatus over a TCP/IP network.
Figure 5:
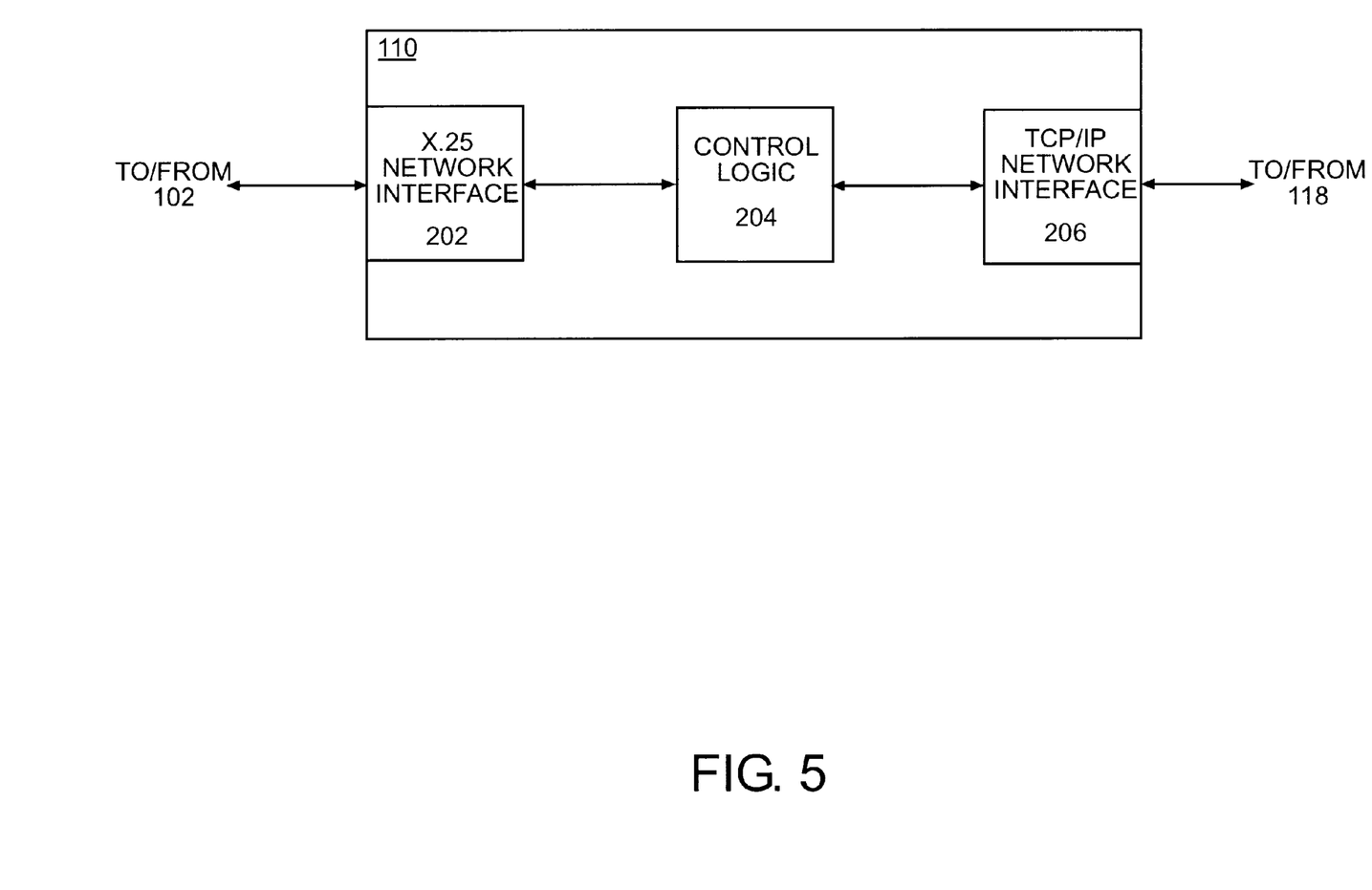
FIG. 5 is a block diagram of a preferred translating device for use in a mixed X.25 /TCP communication network.

FIG. 4B shows a preferred embodiment of the data communication network 100 in which the first communication protocol is the X.25 protocol and the second communication protocol is the TCP protocol. Thus, in accordance with a preferred embodiment of the present invention as shown in FIG. 4B, the X.25 devices 102 communicate with the translating apparatus 110 across an X.25 network 106 using the X.25 protocol, and the TCP device 118 communicates with the translating apparatus 110 across a TCP/IP network 114 using the TCP protocol. The preferred translating apparatus 110, as shown in FIG. 5, therefore includes an X.25 network interface 202 for interfacing with the X.25 network 106 and a TCP/IP network interface 206 for interfacing with the TCP/IP network 114.

In order for the X.25 devices 102 to communicate with the TCP device 118 within the data communication network 100, it is necessary for end-to-end connections to be established between the X.25 devices 102 and the TCP device 118. In order for an end-to-end connection to exist between an X.25 device 102 and the TCP device 118, there must be both an active X.25 connection between the X.25 device 102 and the translating apparatus 110 and an active TCP connection between the translating apparatus 110 and a particular socket in the TCP device 118 (referred to hereinafter as the "destination socket"). In accordance with a preferred embodiment of the present invention, the X.25 devices 102 communicate with the translating apparatus 110 over dedicated X.25 PVCs, and therefore active X.25 connections exist between the X.25 devices 102 and the translating apparatus 110 as long as the X.25 network 106 is operative. On the other hand, because the TCP device 118 communicates with the translating apparatus 110 over a switched TCP connection, the TCP connection between the translating apparatus 110 and a destination socket is established dynamically.

Furthermore, in order for the translating device 10 to provide an end-to-end connection between the X.25 devices 102 and the TCP device 118, the translating apparatus 110, and particularly the control logic 204, maintains a map associating the X.25 PVCs with their corresponding destination sockets. In accordance with a preferred embodiment of the present invention, one X.25 PVC maps to one destination socket, and multiple X.25 PVCs can map to the same destination socket as is typically the case when multiple X.25 client devices 102 are communicating with the same TCP server device 118. Application data received from the X.25 devices 102 over the X.25 PVCs is transmitted by the translating apparatus 110, and particularly by the control logic 204, to the TCP device 118 over the corresponding TCP connections. Likewise, application data received from the TCP device 118. over the TCP connections is transmitted by the translating apparatus 110, and particularly by the control logic 204, to the X.25 devices 102 over the corresponding X.25 PVCs. Exemplary embodiments of control logic 204 for transferring application data between the X.25 device 102 and the TCP device 118 are described in the related U.S. patent applications Ser. No. 09/167,702 still pending and Ser. No. 09/167,811 now U.S. Pat. No. 6,311,22.

When communication between the X.25 devices 102 and the TCP device 118 is completed, it is often desirable for the end-to-end connections between the X.25 devices 102 and the TCP device 118 to be terminated. Because the X.25 devices 102 communicate with the translating apparatus 110 over dedicated X.25 PVCs, the X.25 connections between the X.25 devices 102 and the translating apparatus 110 cannot be terminated. On the other hand, because the TCP device 118 communicates with the translating apparatus 110 over a switched TCP connection, the TCP connection between the translating apparatus 110 and a particular socket in the TCP device 118 is terminated dynamically.

In the data communication network 100, connection establishment and termination may be initiated by either the X.25 devices 102 or the TCP device 118. The related U.S. patent application Ser. No. 09/167,916 now U.S. Pat. No. 6,226,676 describes a first exemplary embodiment in which the X.25 devices 102 initiate connection establishment and termination. The related U.S. patent application Ser. No. 09/167,839 now U.S. Pat No. 6,320,874 describes a second exemplary embodiment in which the TCP device 118 initiates connection establishment and termination.

Under certain circumstances, an attempt to establish a TCP connection between the translating apparatus 110 and the TCP device 118 may fail. For example in the connection, establishment mechanism described in the related U.S. patent application Ser. No. 09/167,916 now U.S. Pat. No. 6,226,676 in which the translating apparatus 110 performs a TCP open procedure with the TCP device 118 upon receiving an X.25 data packet from the X.25 device 102, it is conceivable that message transfers between the translating apparatus 110 and the TCP device 118 will be lost, resulting in a failure of the translating apparatus 110 to establish the TCP connection with the TCP device 118. If this occurs, it is desirable for the translating apparatus 110 to suspend data flow between the X.25 device 102 and the translating apparatus 118, repeat the TCP connection establishment mechanism until a TCP connection is established between the translating apparatus 110 and the TCP device 118, and then enable data flow between the X.25 device 102 and the translating apparatus 118.

Under other circumstances, an existing TCP connection between the translating apparatus 110 and the TCP device 118 may fail or be explicitly terminated. For example, a network error may cause the existing TCP connection to be dropped, or the existing TCP connection may be explicitly terminated using the connection termination mechanism described in the related U.S. patent application Ser. No. 09/167,859 now U.S. Pat. No. 6,320,874. If an existing TCP connection is lost or terminated, it is often desirable for the translating apparatus 110 to suspend data flow between the X.25 device 102 and the translating apparatus 118, repeat the TCP connection establishment mechanism until a TCP connection is established between the translating apparatus 110 and the TCP device 118 or other TCP device, and then enable data flow between the X.25 device 102 and the translating apparatus The related U.S. patent application Ser. No. 09/167,950 still depending describes a general error recovery technique in which the translating apparatus 110 suspends data flow with the X.25 device upon detecting a TCP connection failure and enables data flow with the X.25 device upon re-establishing the TCP connection. The affected TCP connection(s) are re-established while data flow is suspended on the affected X.25 PVC(s).

A preferred embodiment of the present invention provides an efficient technique for recovering multiple failed connections to the same destination socket. Specifically, upon detecting a TCP connection failure to a particular destination socket, a session state indicator associated with the destination socket (indicating whether the connection to the destination socket is in an ESTABLISHED state or a RETRY state) is set to the RETRY state, and a retry timer is started (if the retry timer is not already running).

Figure 6:
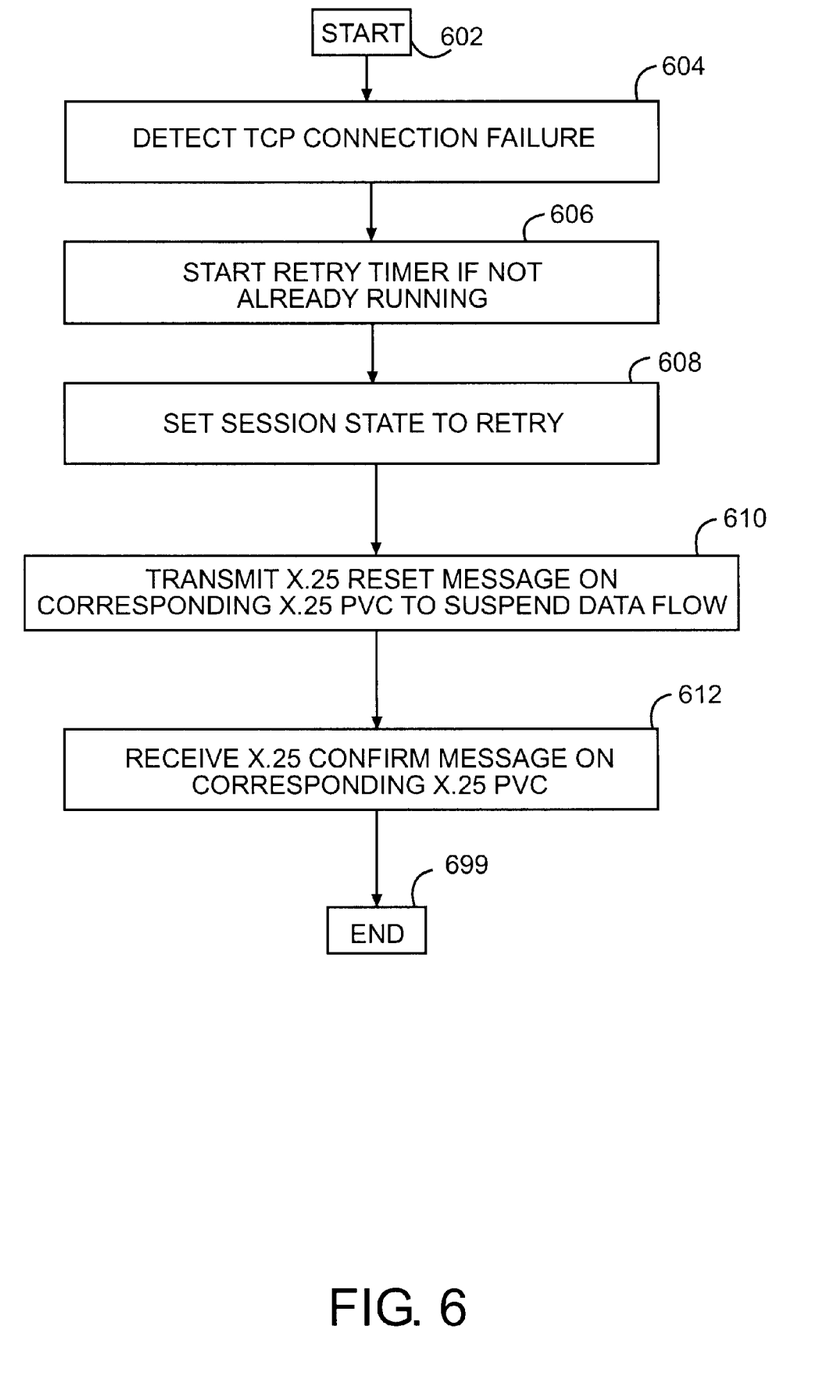
FIG. 6 is a logic flow diagram for initiating a restart timer upon detection of a connection failure in accordance with a preferred embodiment of the present invention.

Thus, the translating apparatus 110, and particularly the control logic 204, includes logic for starting the retry timer. More specifically, the control logic 204 includes logic for performing a set of steps as shown in FIG. 6. After beginning at step 602, and upon detecting a TCP connection failure in step 604, the control logic 204 starts the retry timer if the retry timer is not already running, in step 606. In accordance with a preferred embodiment of the present invention, the retry timer is set to run after fifteen (15) seconds. The control logic 204 then sets the session state indicator associated with the destination socket equal to the RETRY state in step 608. When used in conjunction with the error recovery mechanism described in the related U.S. patent application Ser. No. 09/167,950 still pending, the control logic 204 further transmits an X.25 reset message to each affected X.25 PVC, in step 610, and receives an X.25 confirm message on each of the affected X.25 PVCs, in step 612. The control logic 204 terminates in step 699.

Figure 7:
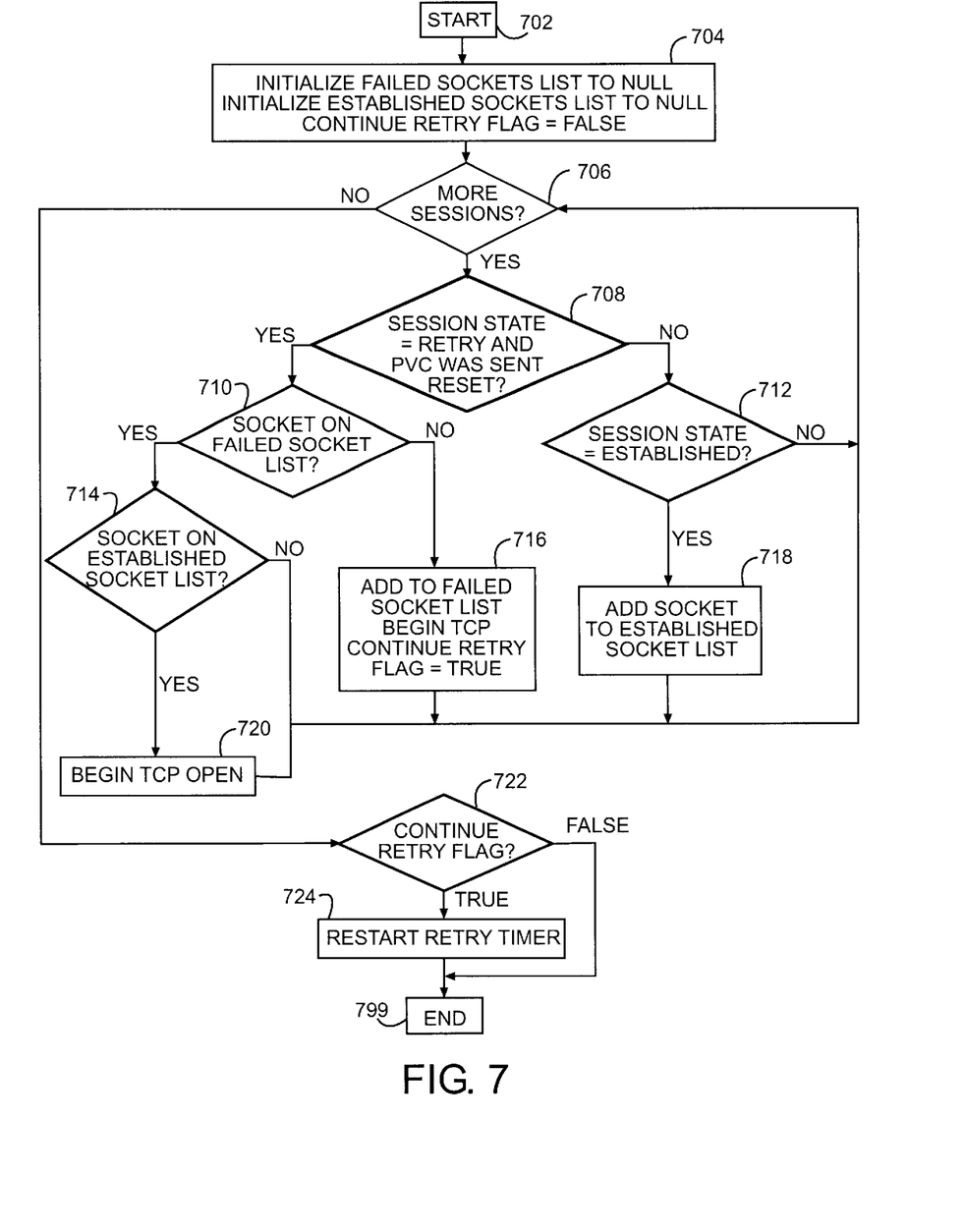
FIG. 7 is a logic flow diagram for connection recovery logic in accordance with a preferred embodiment of the present invention.

When the retry timer expires, the control logic 204 performs connection recovery logic. The connection recovery logic maintains two lists, a failed sockets list and an established sockets list. The connection recovery logic also maintains a retry indicator, referred to hereinafter as the "Continue Retry Flag."

Thus, the translating apparatus 110, and particularly the control logic 204, includes connection recovery logic for performing a set of steps as shown in FIG. 7. After beginning at step 702, the control logic 204 clears the failed sockets list and the established sockets list (i.e , the lists are initialized to NULL), and sets the Continue Retry Flag is equal to FALSE in step 704. The control logic 204 then cycles through each session (i.e., connection) in a session list as follows.

If there is a session to be processed (YES in step 706), the control logic 204 checks the status of the session, in step 708. Specifically, if the session state indicator associated with the session is equal to the RETRY state and the corresponding X.25 PVC was sent a reset (YES in step 708), then the control logic 204 checks whether or not the socket associated with the session is on the failed sockets list, in step 710. If the socket is not on the failed sockets list (NO in step 710), then the control logic 204 adds the socket to the failed sockets list, begins a TCP open procedure to establish a connection to the destination socket, and sets the Continue Retry Flag equal to TRUE, in step 716, and recycles to step 706 to process the next socket.

If the socket is on the failed sockets list (YES in step 710), then the control logic 204 checks whether or not the socket is on the established sockets list, in step 714. If the socket is not on the established sockets list (NO in step 714), then the control logic 204 recycles to step 706 to process the next socket. If the socket is on the established sockets list (YES in step 714), then the control logic 204 begins a TCP open procedure to establish a connection to the destination socket, in step 720, and recycles to step 706 to process the next session.

Returning to step 708, if the session state indicator is equal to the ESTABLISHED state or the corresponding X.25 PVC was not sent a reset (NO in step 708), then the control logic 204 checks whether the session state indicator is equal to the ESTABLISHED state, in step 712. If the session state indicator is not equal to the ESTABLISHED state (NO in step 712), then the control logic 204 recycles to step 706 to process the next session. If the session state indicator is equal to the ESTABLISHED state (YES in step 712), then the control logic 204 adds the associated socket to the established sockets list, in step 718, and recycles to step 706 to process the next session.

When all sessions have been processed (NO in step 706), the control logic 204 checks the Continue Retry Flag, in step 722. If the Continue Retry Flag is equal to FALSE in step 722, then the control logic terminates in step 799. If the Continue Retry Flag is equal to TRUE in step 722, then the control logic 204 restarts the retry timer in step 724, and terminates in step 799.

Although the various embodiments are described with specific reference to a translating apparatus for enabling communication between an X.25 device and a TCP device, it will be apparent to a skilled artisan that the techniques of the present invention apply more generally to a translating apparatus for enabling communication between two devices supporting different communication protocols. Thus, the translating apparatus enables communication between a first device utilizing a first communication protocol and a second device utilizing a second communication protocol. More specifically, the first device communicates with the translating apparatus using the first communication protocol, and the second device communicates with the translating apparatus using the second communication protocol. The translating apparatus performs the functions necessary to establish an end-to-end connection between the first device and the second device, for example, as described in the related U.S. patent applications Ser. No. 09/167,916 now U.S. Pat. No. 6,226,676 and Ser. No. 09/167,839 now U.S. Pat. No. 6,320,879 terminate an end-to-end connection device, for example, as described in the related U.S. patent applications Ser. No. 09/167,916 now U.S. Pat No. 6,226,672 and Ser. No. 09/167,839 now U.S. Pat. No. 6,320,874; recover from a connection failure, for example, as described herein and in the related U.S. application Ser. No. 09/167,950 still pending; and exchange application data, for example, as described in the related U.S. patent applications Ser. No.

09/167,792 now U.S. Pat. No. 6,226,075 and Ser. No. 09/167,811 now U.S. Pat. No. 6,311,222.

In a preferred embodiment of the present invention, the control logic 204 is implemented as a set of program instructions that are stored in a computer readable memory within the translating apparatus 110 and executed on a microprocessor within the translating apparatus 110. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific forms without departing from the essence or essential characteristics. The described embodiments are to considered in all respects only as illustrative and not restrictive.

We claim:

1. A method for recovering multiple connections in a communication network, the method comprising the steps of:
    initially establishing a plurality of connections according to a first protocol to a translating apparatus;
    establishing a second plurality of connections from the translating apparatus to a second apparatus with a second protocol, said second protocol different than said first protocol;
    translating between said first protocol and said second protocol with said translating apparatus;
    detecting a failure affecting said second plurality of connections;
    selecting one of said second plurality of connections;
    performing a connection establishment procedure to re-establish the selected connection; and
    upon successfully re-establishing the selected connection, period the connection establishment procedure for the remainder of the second plurality of connections.

2. The method of claim 1, wherein the second plurality of connections are Transmission Control Protocol (TCP) connections.

3. The method of claim 2, wherein the detecting the failure affecting the second plurality of connections comprises:
    detecting a TCP connection failure to a destination socket common to the second plurality of connections.

4. The method of claim 2, wherein performing the connection establishment procedure to reestablish the selected connection comprises:
    performing a first TCP open procedure for the selected connection.

5. The method of claim 4, wherein performing the connection establishing procedure for the remainder of the plurality of connections upon successfully re-establishing the selected connection comprises:
    determining that the selected connection has been established through the first TCP open procedure; and
    performing a second TCP open procedure for another connection.

6. An apparatus comprising:
    a first plurality of connections according to a first protocol;
    a second plurality of connections according to a second protocol, said second protocol different from said first protocol;
    translation logic operably coupled to said first and second pluralities of connections for translating between said first and second protocols;
    failure detection logic operably coupled to detect a failure affecting said second plurality of connections;
    selection logic responsive to the failure detection logic and operably coupled to select one of said second plurality of connections;
    first connection re-establishment logic responsive to the selection logic and operably coupled to re-establish the selected connection; and
    second connection re-establishment logic responsive to the first connection re-establishment logic and operably coupled to re-establish the remaining connections upon successful re-establishment of the selected connection.

7. The apparatus of claim 6, wherein the second plurality of connections are Transmission Control Protocol (TCP) connections.

8. The apparatus of claim 7, wherein the failure detection logic is operably coupled to detect a TCP connection failure to a destination socket common to the second plurality of connections.

9. The apparatus of claim 7, wherein the first connection re-establishment logic is operably coupled to perform a first TCP open procedure for the selected connection.

10. The apparatus of claim 9, wherein the second connection re-establishment logic is operably coupled to determine that the selected connection has been established by the first connection re-establishment logic and perform a second TCP open procedure for another connection.

11. A computer program for controlling a computer system, the computer program comprising:
    first connection establishment logic programmed to establish a first plurality of connections according to a first protocol;
    second connection establishment logic programmed to establish a second plurality of connections according to a second protocol, said first protocol different than said second protocol;
    translation logic for translating between said first and second protocols and operably associated with said first and second pluralities of connections;
    failure detection logic programmed to detect a failure affecting the second plurality of connections,
    selection logic responsive to the failure detection logic and programmed to select one of said second plurality of connections;
    first connection re-establishment logic responsive to the selection logic and programmed to re-establish the selected connection; and
    second connection re-establishment logic responsive to the first connection re-establishment logic and programmed to re-establish the remaining connections upon successful re-establishment of the selected connection.

12. The computer program of claim 11, wherein the second plurality of connections are Transmission Control Protocol (TCP) connections.

13. The computer program of claim 12, wherein the failure detection logic is programmed to detect a TCP connection failure to a destination socket common to the second plurality of connections.

14. The computer program of claim 12, wherein the first connection re-establishment logic is programmed to perform a first TCP open procedure for the selected connection.

15. The computer program of claim 14, wherein the second connection re-establishment logic is programmed to determine that the selected connection has been established by the first connection re-establishment logic and perform a second TCP open procedure for another connection.

16. The computer program of claim 11 embodied in a computer readable medium.

17. The computer program of claim 11 embodied in a data signal.

18. A communication system comprising a plurality of clients in communication with a server through a translating apparatus, wherein the translating apparatus is operably coupled to establish a plurality of connections between the plurality of clients and the server, wherein the plurality of connections comprises a first plurality of connections using a first protocol and a second plurality of connections using a second protocol, said translating apparatus further adapted to:

translate between said first and second protocols, detect a failure affecting the second plurality of connections;

select one of said plurality of connections;

re-establish the selected connection, and re-establish the remaining connections after re-establishing the selected connection.

19. The communication system of claim 18, wherein the second plurality of connections are Transmission Control Protocol (TCP) connections.

20. The communication system of claim 19, wherein the translating apparatus is operably coupled to detect a TCP connection failure to a destination socket common to the plurality of connections.

21. The communication system of claim 19, wherein the translating apparatus is operably coupled to perform a first TCP open procedure for the selected connection in order to re-establish the selected connection.

22. The communication system of claim 21, wherein the translating apparatus is operably coupled to determine that the selected connection has been established by the first connection re-establishment logic and perform a second TCP open procedure for another connection.

23. The communication system of claim 18, wherein the clients are X.25 clients, and wherein the server is a Transmission Control Protocol (TCP) server.

* * * * *